United States Patent
Watson

[15] 3,693,392
[45] Sept. 26, 1972

[54] AUTOMOBILE CONVEYOR
[72] Inventor: John Watson, Vancouver, British Columbia, Canada
[73] Assignee: Monarch Western Equipment Ltd., British Columbia, Canada
[22] Filed: June 3, 1971
[21] Appl. No.: 149,525

[52] U.S. Cl. ............................................. 104/172 B
[51] Int. Cl. .................................................. B61b 13/00
[58] Field of Search ................................. 104/172 B

[56] References Cited

UNITED STATES PATENTS

| | | | |
|---|---|---|---|
| 1,740,014 | 12/1929 | Hawkins | 104/172 B |
| 3,554,132 | 1/1971 | Hanna et al. | 104/172 B |

*Primary Examiner*—Gerald M. Forlenza
*Assistant Examiner*—L. Oresky
*Attorney*—Brain J. Wood

[57] ABSTRACT

Automobile conveyor apparatus having a continuous chain running beneath a slotted car supporting platform, the chain having pushing assemblies mounted at spaced intervals thereon normally passing beneath the platform and selectively movable on passage of a front wheel and rear wheel of the automobile over an advance end of the platform to a tire engaging position supported on top of the platform. A ramp, spring urged to, and releasibly locked in, a horizontal supporting position at an opening in the platform spaced from the advance end thereof a distance a little greater than a car length is released by operation of a lever disposed in the path of an automobile approaching the opening to permit the ramp to swing to a sloping non-supporting position so that a pushing assembly pushing the front wheel of the automobile can descend through the opening to an inoperative position. The lever is positioned so that it clears the automobile before a rear wheel of the automobile reaches the opening so as to lock the ramps in a horizontal supporting position so that a pushing assembly pushing the rear wheel passes over the opening and pushes the automobile the length of the platform.

4 Claims, 8 Drawing Figures

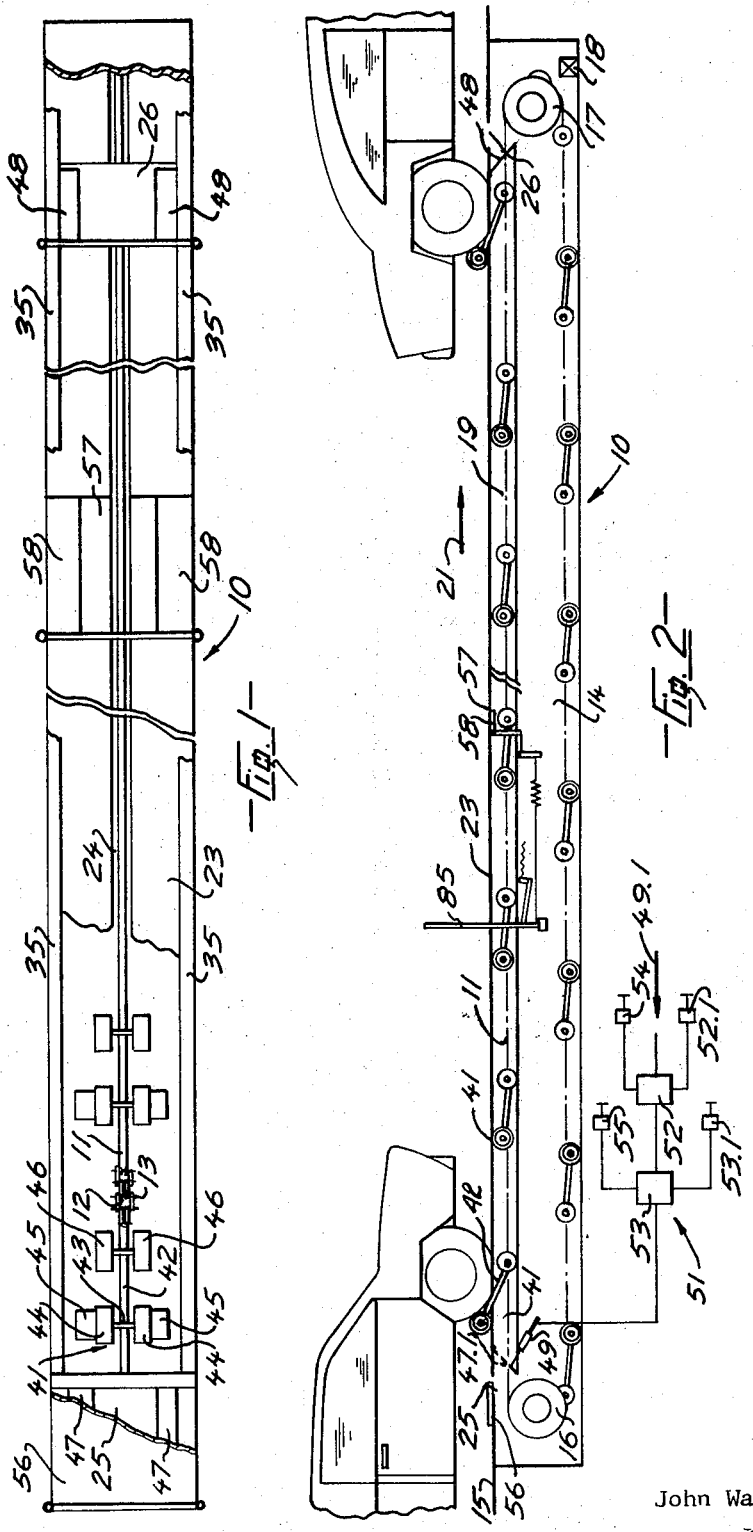

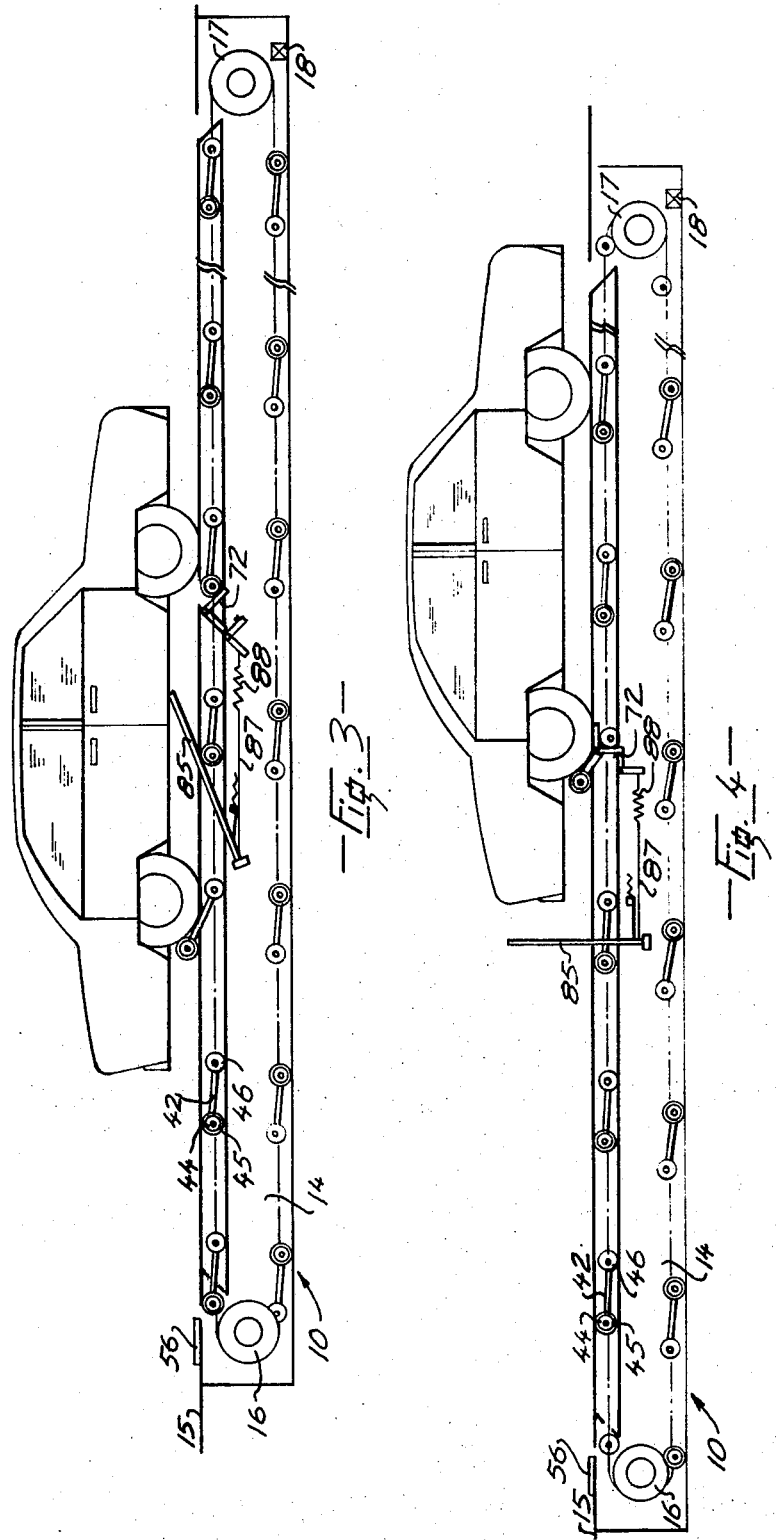

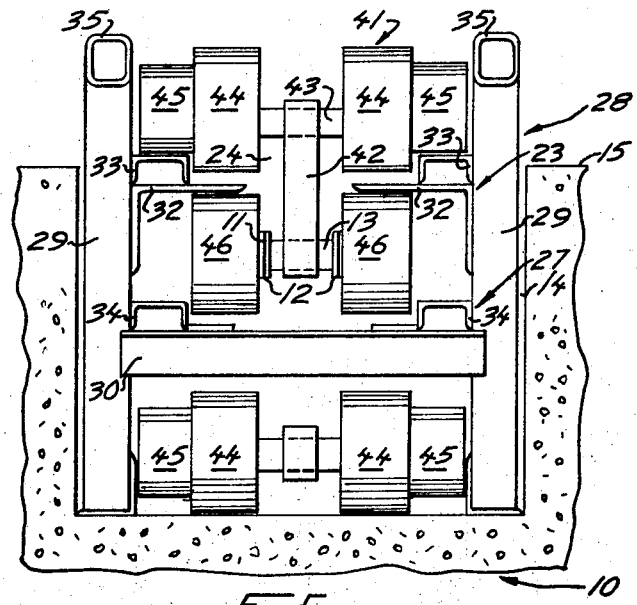
-Fig. 5-
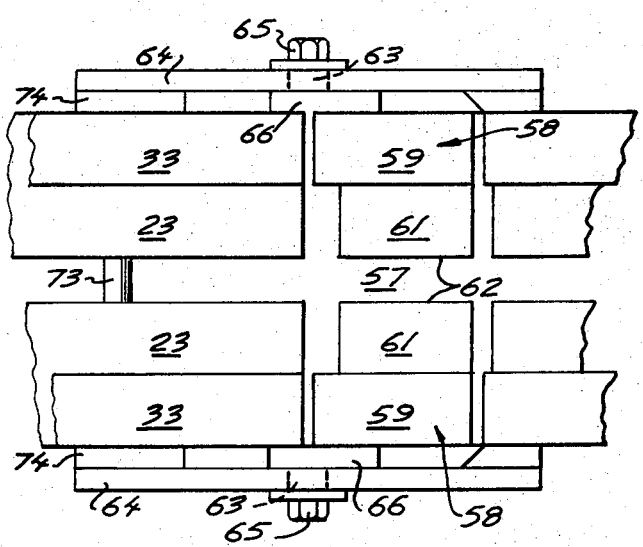
-Fig. 6-
John Watson, Inventor
by Lyle G. Trorey, Agent

AUTOMOBILE CONVEYOR

BACKGROUND OF THE INVENTION

1. Field of the Invention

This invention relates to automobile conveyors used particularly in, but not limited to, washing plants.

2. Prior Art

Conveyors for moving an automobile through washing facilities of washing plants generally have an endless conveyor chain disposed beneath a platform over which the automobile runs, the chain having wheel pushing assemblies mounted thereon at spaced intervals which move into a pushing position behind the front or rear tire of one side of an automobile so as to push the automobile through the plant washing facilities.

In some conveyors the automobile is driven onto the platform a sufficient distance to enable a wheel pushing assembly to be brought up into engagement with the rear tire to the automobile and the automobile then pushed the length of the conveyor. The conveyor must be about fifteen feet (one automobile length) longer than is necessary to accommodate an automobile waiting at the advance end of the conveyor.

In order to obviate the requirement of providing an extra twelve foot length of conveyor and platform it has been the practice to move an automobile under its own power onto the platform a distance sufficient to enable a pushing assembly to be brought into pushing engagement with a front wheel to move the automobile along the platform until it reaches the end of the platform where the assembly pushing the front wheel drops below the platform. A pushing assembly which has been lifted on top of the platform behind the rear tire then moves into engagement with said rear tire and pushes the automobile off the platform. This procedure results in a slight pause in movement of the automobile when it reaches the end of the platform and an automobile driver who is in a following automobile and seeing the automobile ahead of him stop quite often applies his brakes to bring his automobile to a stop. Consequently drivers of automobiles behind him must apply their brakes. An entire line of automobiles at the time passing through a wash plant is affected. The entire operation must be halted and the automobiles and assemblies rearranged. Occurrences of this nature occur very frequently causing considerable down time of the washing plant and great inconvenience to customers.

SUMMARY OF THE INVENTION

The present invention provides an automobile conveyor of a type wherein an automobile is first moved by engagement of a pushing assembly with a front wheel followed by engagement with a pushing assembly by a rear wheel yet which avoids momentary hesitation of an automobile when it reaches a terminal end of the platform as is common with automobile conveyors of this type.

Further, the conveyor of the present invention unlike those conveyors constructed to move automobiles by rear wheels only, does not require extra length of platform and conveyor chain. Consequently saving of working space is obtained - an important feature when land costs are high. The conveyor apparatus of the present invention is also less costly as it is shorter in length.

The conveyor of the present invention includes a slotted platform for supporting tires on one side of an automobile during passage of an automobile through a washing plant, a continuous conveyor chain running below the platform, wheel pushing assemblies mounted at spaced intervals along the chain normally passing beneath the platform, means at a head end of the platform lifting a selected pushing assembly to an operative position on top of the platform so as to engage the tire of a car waiting on the platform, an opening in the platform spaced from an advance end of the latter a distance a little greater than a length of an automobile, a ramp at the opening swingable between a normal horizontal supporting position across the opening for passing any lifted wheel assemblies across the opening and a sloped position in which any lifted pushing assemblies pass downwards through the opening to an inoperative position beneath the platform, latch means releasibly locking the ramp in a horizontal supporting position and release means in the path of an automobile approaching the opening and operable by front bumper of the automobile passing thereover for operating the latch means to an unlatching position so as to enable an assembly engaged with a front wheel of an automobile to pass through the opening, said release means being positioned so as to clear a rear bumper of the automobile before a rear wheel thereof reaches the opening so as to enable a lifted assembly behind the rear wheel to pass over the opening and push the automobile the length of the platform.

DESCRIPTION OF THE DRAWINGS

FIG. 1 is a plan view of the conveyor apparatus of the invention portions of the platform being removed for purposes of clarity of illustration, FIGS. 2, 3, and 4 are elevations showing, diagrammatically the conveyor and automobiles in various positions passing therealong, FIG. 5 is an enlarged sectional view of the conveyor on 5—5 of FIG. 2, FIG. 6 is an enlarged plan view of the conveyor showing an opening in ramps thereat.

DETAILED DESCRIPTION

FIGS. 1, 2, and 5

Figure 7:
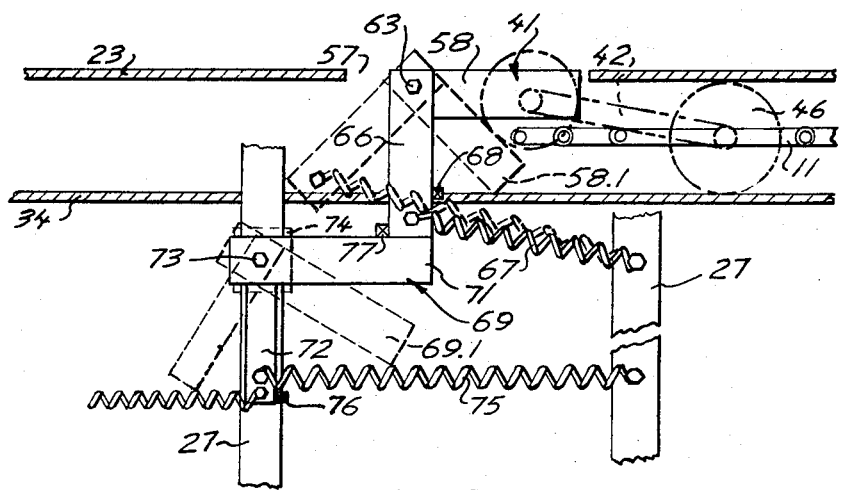
FIG. 7 is an elevation of the portion of the conveyor shown in FIG. 6.

FIGS. 1 and 2 show conveyor 10 which includes an endless conveyor chain 11 of a conventional type having link plates 12 connected by link pins 13, see FIG. 5. The chain is disposed in a trench 14 below floor level 15 and passes over a take-up sprocket 16 and driven sprocket 17, the latter being driven in a known manner by an electric motor 18 so that an upper run 19 of the chain moves below floor level in a direction as shown by an arrow 21.

A platform 23 extends over the trench and has a centrally located longitudinally extending slot 24 which terminates at an advance end in a transverse opening 25 and at a terminal end of the conveyor in a transverse opening 26.

The platform is part of a frame 27 extending longitudinally of the trench, the frame, see FIG. 5 being formed of a plurality of interconnected and longitudinally spaced apart H-frames 28 having vertical members 29–29 and horizontal members 30. The platform is formed of a pair of spaced angles 32–32 connected to the vertical members, each angle having a longitudinally extending wear strip 33. Wear strips 34 are also secured to the horizontal members 30. Tubular guide rails 35–35 are secured to upper ends of the vertical members 29–29. The rails maintain tires on one side of an automobile centered on the platform on passage of the automobile along the platform.

Automobile wheel pushing assemblies severally 41 are mounted at regularly spaced apart intervals on the chain. Each assembly, see FIGS. 1 and 5, has a swinging arm 42 swingably mounted at one end on a link pin of the chain. At the other end of the arm a transversely extending axle 43 is mounted, the axle carrying a pair of pushing rollers 44–44. Supporting rollers 45–45 are also mounted on the axle outboard of the pushing rollers. The link pin to which the swinging arm 42 is connected has a pair of holddown rollers 46–46 mounted thereon on opposite sides of the chain. As construction and operation of the pushing assemblies and holddown rollers are well known in the art further details as to construction relative thereto is deemed unnecessary.

The assemblies and holddown rollers passing off the take-up sprocket normally pass in a hidden, inoperative position below the platform then pass around the drive sprocket and return on the lower run of the chain.

A pair of ramps 47–47, see FIGS. 1 and 2, are swingably mounted, in a known manner, at the opening 25, the ramps being spaced apart and aligned with the supporting rollers of the holddown assemblies. The ramps are movable between a horizontal position over the opening, as shown in solid outline of FIG. 1, and a sloped position shown in broken outline 47.1, FIG. 2. In the horizontal position the assemblies 41 and holddown rollers pass below the platform, however in the sloped position the ramps are engaged by the supporting rollers so that the pushing rollers and supporting rollers are lifted to an elevated position on top of the platform. The supporting rollers ride on the wear strips 33 so that the pushing rollers are freely rotatable and can move in behind and push against a tire of a car on the platform. Pushing and supporting rollers which are carried in an operative position on top of the platform the full length thereof reach the terminal opening 26 and pass down swinging ramps 48–48 for passage around the drive sprocket and return along the return run of the chain.

Construction of the ramps 47–47 and 48–48 are well known in conveyor art and are therefore not described in detail.

The ramps 47–47 are spring urged, in a known manner, to a normal horizontal position and are moved from their horizontal to their sloped positions by operation of a single acting pneumatic ram 49 which has a connection to a source of pressurized air 49.1 through a valve arrangement 51. The arrangement 51 has two normally closed three-way positioned bleeder operated valves 52 and 53 connected in series between the ram and the source of pressurized air, both valves being in a normally closed position. The valve 52 has a pressurized operated bleeder 52.1 located beneath a treadle 56 which extends across the opening 25 and which when pressed by an automobile tire passing thereover bleeds air from the valve 52 so as to cause its actuation to an open position and admit air to the valve 53. The valve 53 has a pressure operated bleeder 53.1 which is located in the path of the supporting rollers of any assembly passing off the take-up sprocket operable when touched to bleed air from the valve 53 so that the valve 53 admits air to the ram. This results in movement of the ramps 47–47 to their sloped positions and elevates the supporting and pushing rollers of a pushing assembly approaching said ramps to an elevated position on the platform. As the rollers pass up the ramps 47–47 the treadle is lifted. When the treadle is moved to its highest position it operates a pair of reset bleeders 54 and 55 actuation of which bleeds air from the valves 52 and 53 so as to return them to a closed position allowing air to escape from the ram so the ramps 47–47 return automatically to their horizontal positions. Construction, operation and use of the valve arrangement as above described with respect to automobile conveyors is well known.

It is seen that only one group of pushing and supporting rollers are lifted from their normal hidden inoperative position for each passage of an automobile tire over the treadle. It is to be understood that other well known mechanisms for obtaining automatic operation of the ramps, can be used.

FIGS. 1, 2, 6, 7, and 8

The platform has an intermediate opening 57 spaced over one automobile wheel base length (approximately 12 feet) following the opening 25 which is large enough to enable a pushing assembly 41 to pass therethrough. A pair of ramps 58–58 are mounted at the opening 57 for pivotal movement about an axis transverse of the platform. The ramps 58–58, see FIG. 6, each of which has an outer ramp portion 59 aligned with the wear strips 33 and an inner portion 61 having an inner edge 62 aligned with an inner edge of the platform, have outwardly extending pins 63–63 which extend through plates 64–64 secured to the framework 27, the pins being threaded at outer ends to receive nuts 65.

Each of the ramps 58–58, see FIG. 7, has an operating lever 66. A tension spring 67 extends between the operating levers 66 and a vertical member 29 of a suitable H-frame. As seen in FIG. 7 the spring 67 normally urges the ramps 58–58 to a horizontal supporting position over the opening 57, limited by engagement of the levers 66 with stops 68, the strength of the springs 67 being such that under the weight of a pushing assembly 41 the ramps can swing from a horizontal supporting position, as shown in solid outline, to a sloped position, as shown in broken outline 58.1, thus enabling the pushing assembly to descend below the platform.

The ramps 58–58 are normally releasibly locked in their supporting positions by latching elements 69–69, one being shown in FIG. 7. The latching elements are T-shaped each having a latching bar 71 and an operating leg 72, the bars 71 being non-rotatably mounted on opposite ends of a shaft 73, see also FIG. 6, which extends transversely of the platform below the wear strips 34. The transverse shaft 73 is supported for rotation in brackets 74 secured to the frame 27. A tension spring 75 connected at one end to an operating leg 72 of one of the latch elements and at its other end to a suitable portion of the frame urges the latching elements to a latching position, solid outline, FIG. 7, against a stop 76. In their latching positions the latching elements extend substantially horizontally beneath the levers 66 of the ramps 58–58 when the latter are in their supporting positions. A stop 77 on the bar 71 of each of the latching elements extends behind the lever 66 of each ramp 58 so as to prevent the ramps swinging to their sloped positions.

Figure 8:
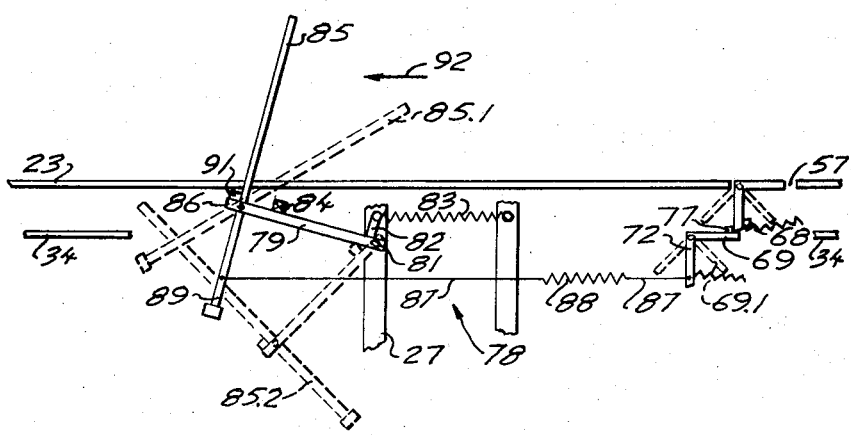
FIG. 8 is an elevation showing ramps of FIG. 7 a release mechanism therefor.

Movement of the latching elements against the action of the spring 75, to an unlatching positions, as shown in broken outline 69.1, FIG. 7, is effected by operation of a release mechanism generally 78, see FIG. 8. The release mechanism includes an arm 79 pivotally mounted at one end 81 on a vertical leg 29 of one of the H-frames 28, the arm having an operating leg 82 connected by a tension spring 83 to a suitable portion of the frame so that the arm is normally urged to an up position, solid outline, against a stop 84 secured to the frame. A wand 85 is pivotally secured, intermediately its ends, to the free end 86 of the arm 79. A cable 87 and tension spring 88 connects a lower end 89 of a wand to the operating leg 72 of one of the latching elements 69, length of the cable being such that when it is just taut the wand normally assumes a vertical position limited by engagement with a stop 91 on the free end of the arm 79.

The wand extends, when the arm is in its up position, about one and a half to two feet above the platform and is located in the path of automobiles passing along the platform. Passage of an automobile over the wand moves the latter to a release position, shown in broken outline 85.1, which results in sufficient tension being applied to the cable 87 to rotate the latching elements 69 to their unlatching position, broken outline 69.1, FIG. 7. The wand is positioned a sufficient distance in advance of the opening 57 (about 6 feet) so that, see FIG. 3, it is contacted by a front bumper of a car passing along the track and moved to a release position before a front wheel of an automobile reaches the opening 57 and can swing to a vertical position clear of the rear bumper of the automobile before a rear tire of the automobile reaches the opening 57, see FIG. 4. The wand it is understood, is maintained in a release position by the undercarriage of of the automobile during passage of the automobile thereover.

OPERATION

During working hours the conveyor chain is in continuous operation with the wheel pushing assemblies normally passing in inoperative positions beneath the platform. The automobiles are driven, under their own power, one after the other, onto the platform. When a front wheel, see FIG. 2, of an automobile passes over the treadle 56 the ramps 48–48 are swung to their sloped positions so that a first pushing assembly passing off the take-up sprocket is elevated to an operative position on top of the platform and moves into pushing engagement behind the front wheel of the automobile so as to push the automobile along the platform. When the rear wheel of the automobile passes over the treadle another pushing assembly is lifted to an operative position and follows but does not engage the rear tire of the automobile. When the front bumper of the automobile, see FIG. 3, touches the wand, the wand is moved to a release position thus moving the latching elements to an unlatching position so that the pushing assembly engages with the front wheel of the automobile upon reaching the opening 57 swings the ramps 58–58 to their sloped position and passes through the opening 57 to an inoperative position below the platform. The automobile momentarily hesitates until the trailing pushing assembly engages the rear wheel.

The wand, as previously described returns to a vertical position when it clears the rear bumper of the car, this occuring before the pushing assembly behind the rear wheel reaches the opening 57, so that the latching elements move into latching engagement with the ramps maintaining the latter in a supporting position so as to enable passage of the pushing assembly pushing the rear wheel thereover. The automobile is then pushed along the platform until the pushing assembly reaches and passes through the opening 26 in the platform for passage around the drive sprocket. The automobile is then driven under its own power off the platform.

It is seen that momentary hesitation of an automobile during passage along the platform occurs at the advance end of the platform so that if a driver of a following automobile which has passed over the treadle should apply his brakes upon seeing the momentary hesitation of the automobile in front, the pushing assembly behind the front wheel of his automobile will simply ride therebeneath and continue in an operative position along the platform. Aline of automobiles on the platform is thus not disturbed. Foot pressure on the treadle can bring up another pushing assembly to engage the front wheel of the stopped automobile to send it along the platform.

Construction of the release mechanism prevents damage to the wand if for some reason or another the automobiles must be backed off the platform. As seen in FIG. 8, if an automobile is backed in a direction as shown by arrow 92 against the wand the arm 79 simply swings to its down position 85.2 swinging the wand with it so as to avoid damage to the wand, and automobile. A line In the description foregoing only one type of conveyor chain and pushing assembly has been described. It is to be understood however that the invention with little or no modification can use other types of conveyor chains and pushing assemblies, for example, assemblies in which pushing collars are mounted directly on pivot pins of the chain and which travel above a platform on which project upwards through the platform when in operative positions. The chain following shall be read accordingly.

I claim:

1. In an automobile conveyor of a type having an automobile supporting platform, a continuous conveyor chain disposed beneath the platform and wheel pushing assemblies mounted in spaced intervals along the chain normally passing in inoperative positions beneath the platform and elevatable through an opening at an advance end of the platform to operative tire pushing positions on top of and supported by the platform for pushing an automobile tire and moving the automobile along the platform:

a. an intermediate opening in the platform spaced at least one automobile wheel base length from the opening at the advance end of the platform through which an elevated assembly moving along the platform can pass through to an inoperative position, b. supporting means at the intermediate opening movable between a support position bridging the opening in which position an elevated assembly can move across the opening and a non-support position in which position an elevated pushing assembly can pass through the opening, c. latching means at the support means for releasably locking supporting means in a supporting position, d. release means for moving the latching means to an unlatching position before a front wheel of an automobile passing along the platform reaches the intermediate opening and for returning the latch means to a latching position before a rear wheel of the automobile reaches the intermediate opening so that a pushing assembly moved into an operative position behind a front wheel of the automobile moves the automobile along the platform until said pushing assembly reaches the opening and descends to an inoperative position and a following pushing assembly elevated to an operative position behind a rear wheel of the automobile travels over the opening so as to move the automobile the length of the platform.

2. A conveyor as claimed in claim 1 in which the supporting means includes a pair of ramps swingably mounted at forward ends for movement between horizontal supporting positions and sloped non-supporting positions and tension springs connected to the ramps normally urging the latter to said supporting positions.

3. A conveyor as claimed in claim 2 in which the latching means includes a pair of latch elements spring urged into latching engagement with the ramps when the latter are in a supporting position.

4. A conveyor as claimed in claim 3 in which a release means includes a normally vertically extending wand pivotly mounted adjacent the platform ahead of the intermediate opening and in the path of an automobile proceeding along the platform so as to be moved to, and be maintained in, a sloped release position during passage of the automobile thereover and means connecting the wand and the latching means for operating the latching means to an unlatching position when the wand is moved to a release position, the wand being located so that it is moved to a release position by engagement with a front bumper of an automobile before the front wheel of the automobile reaches the intermediate opening and clears a rear bumper of the automobile so as to return to a vertical position before a rear wheel of the automobile reaches the intermediate opening.

* * * * *